Figure 1:
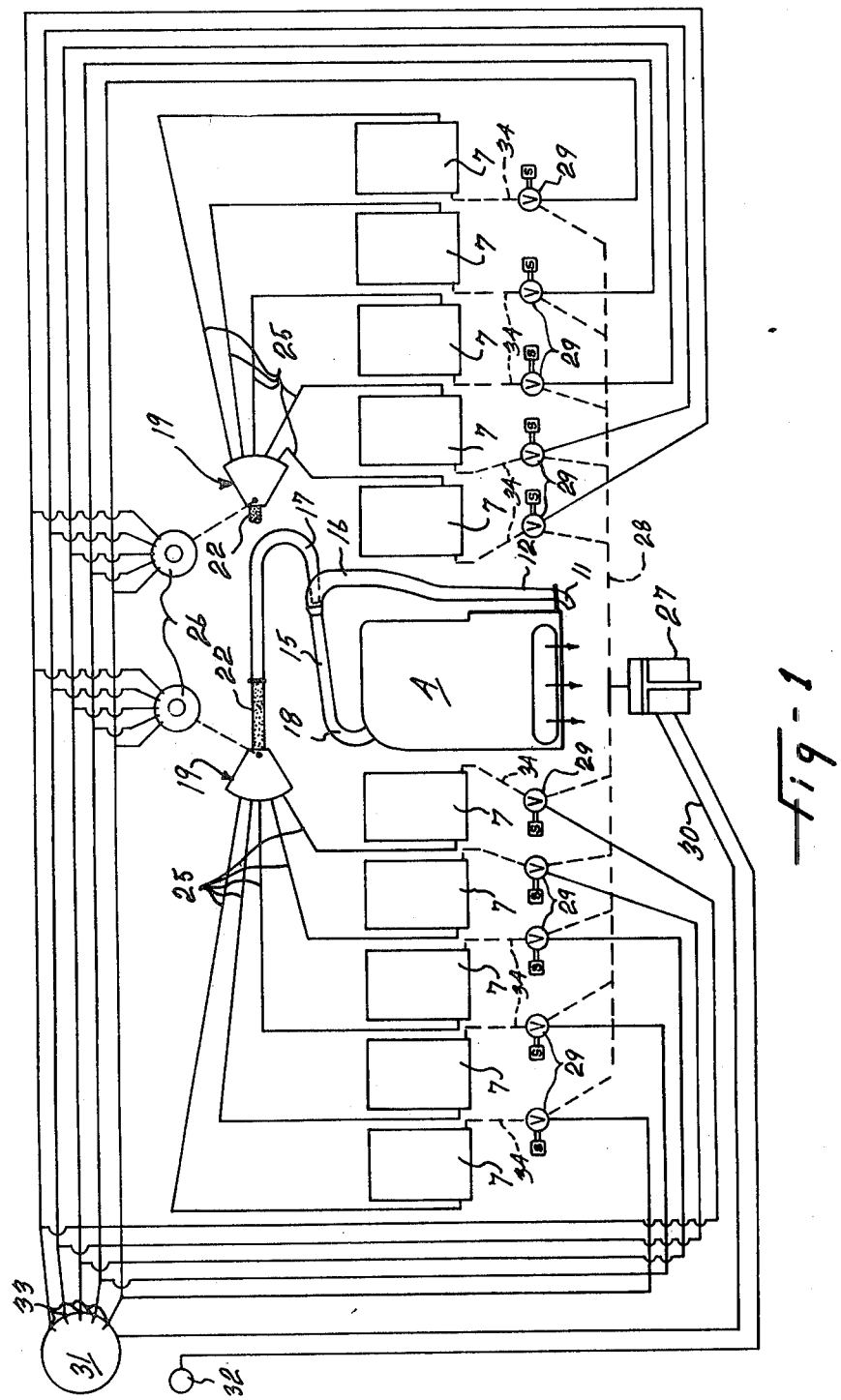

United States Patent [19]

Richardson et al.

[11] 4,172,499
[45] Oct. 30, 1979

[54] POWDER AND WATER MIXING AND DROPPING SYSTEM ONBOARD AN AIRCRAFT

[75] Inventors: Walter R. Richardson, Pointe Claire, Canada; Harry Oakes, Arcadia, Calif.; Saul Bernstein, Montreal, Canada; Avrom R. Handleman, St. Louis, Mo.

[73] Assignee: Canadair Limited, Montreal, Canada

[21] Appl. No.: 857,424

[22] Filed: Dec. 5, 1977

[51] Int. Cl.² .................... A62C 27/30; B05B 17/02
[52] U.S. Cl. ............................... 169/53; 169/14; 239/171; 244/136
[58] Field of Search ................ 169/14, 15, 53; 239/171; 244/136

[56] References Cited

U.S. PATENT DOCUMENTS

| 1,911,431 | 5/1933 | Cawley | 244/136 |
| 3,484,062 | 12/1969 | Johnson | 169/53 X |
| 3,714,987 | 2/1973 | Mattson | 169/15 X |
| 3,754,601 | 8/1973 | Linkewich | 169/53 X |

Primary Examiner—Johnny D. Cherry
Attorney, Agent, or Firm—A. Lebrun

[57] ABSTRACT

A powder and water mixing system which is operatively mounted onboard an aircraft and uses water scooping to automatically produce onboard mixing of powder and water. This system is particularly adapted to drop a fire retardant powder and water mixture from a flying aircraft and includes a pair of tanks, powder containers fore and aft of the tanks, water scoops projecting from the bottom of the aircraft, a pair of powder injection and powder and water mixing devices connected each to a tank, to a water scoop, and to a group of powder containers, a powder container selection valve interposed between each injection and mixing device and the corresponding group of powder containers, and a control connected to each selection valve and arranged to empty a powder container forward of the tanks concurrently with a powder container aft of the tanks, sequentially with water scooping passes by the aircraft.

6 Claims, 4 Drawing Figures

POWDER AND WATER MIXING AND DROPPING SYSTEM ONBOARD AN AIRCRAFT

This invention relates to a system for distribution of a powder and water mixture from a flying aircraft, and more particularly, to a system of the type adapted to be carried onboard a water scooping aircraft to produce a powder and water mixture upon scooping of water and to provide for dropping of the mixture from the flying aircraft.

The use of a fire retardant and water mixture to extinguish fires, such as forest fires, has been proposed and the use of an aircraft to drop the fire retardant and water mixture over a fire has also been proposed before now. However, so far the fire retardant powder and water have been mixed and thereafter loaded onboard the aircraft at a ground base. This is not found convenient due in particular to the flying distance and time required to reach the properly equipped ground base, and to the extra personnel and time used to effect the mixing and loading operation.

It is a general object of the present invention to provide a powder and water mixing system which is particularly adapted to produce mixing of powder and water onboard an aircraft.

It is an object of the present invention to provide a powder and water mixing system which is associated to water scooping by the aircraft to produce onboard mixing under the effect of the scooping action, and more specifically, to use the inflow of water produced by the water scooping action to inject the powder into mixture with the water.

It is a more specific object of the present invention to provide a powder and water mixing system onboard an aircraft wherein the water is provided by successive water scoopings by the aircraft and predetermined loads of powder are automatically mixed with the water sequentially and under the action of the successive water scoopings, during any sortie of the aircraft.

According to the present invention, the powder and water mixing and dropping system onboard an aircraft comprises a powder injection and powder and water mixing device having a water inlet, a powder inlet, and a mixture outlet, a water dropping tank connected to the mixture outlet to receive a powder and water mixture from the mixing device, a water scoop projecting under the aircraft and connected to said water inlet to supply water to the injection and mixing device, powder container means, a powder distribution device communicating the powder container means with the powder inlet and adapted to selectively dispense powder to the powder and water mixing device, and a control connected to the powder distribution device and constructed and arranged to sequentially actuate the latter and allow injection of powder into the injection and mixing device for mixing with scooped water.

Figure 2:
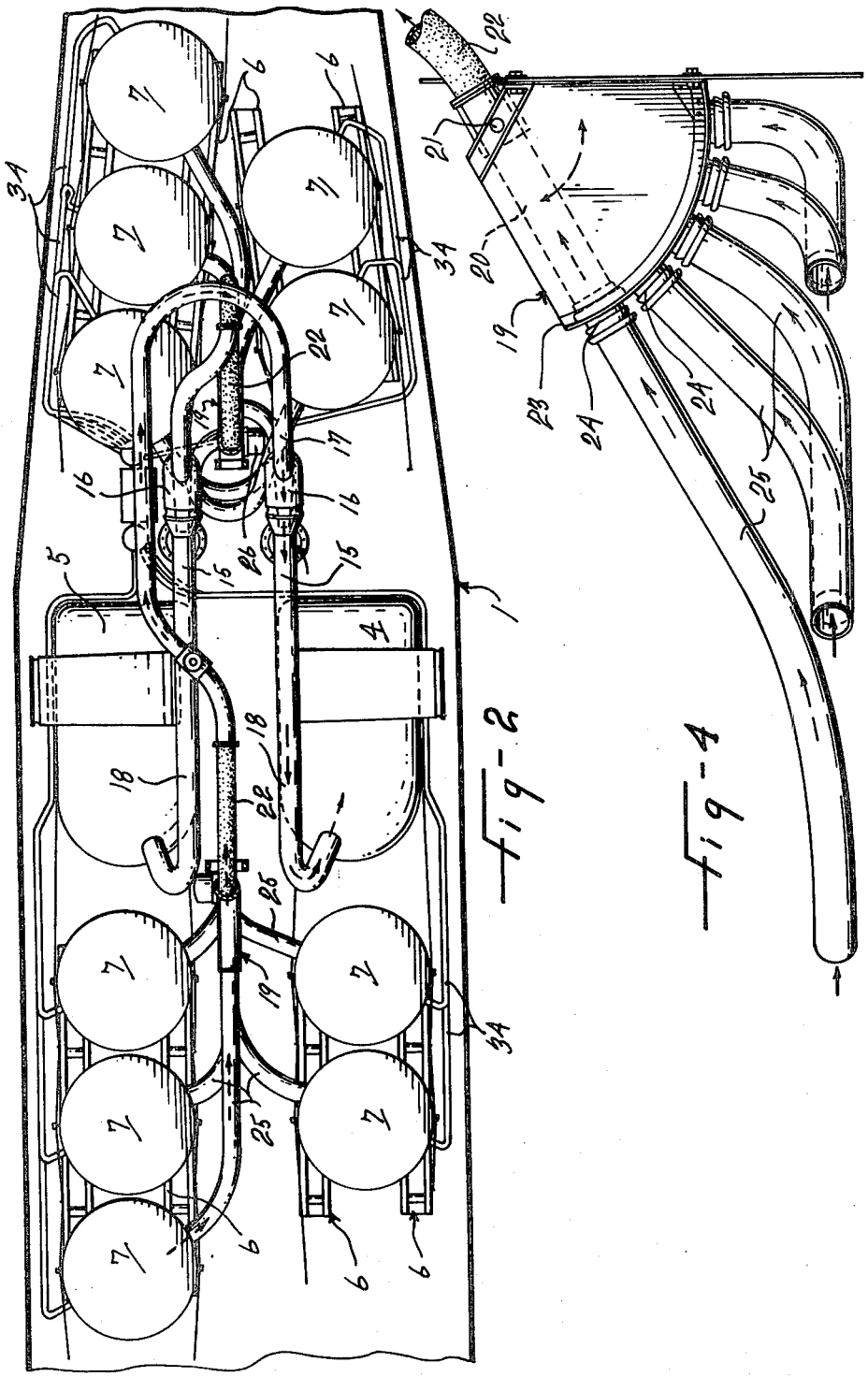
Figure 3:
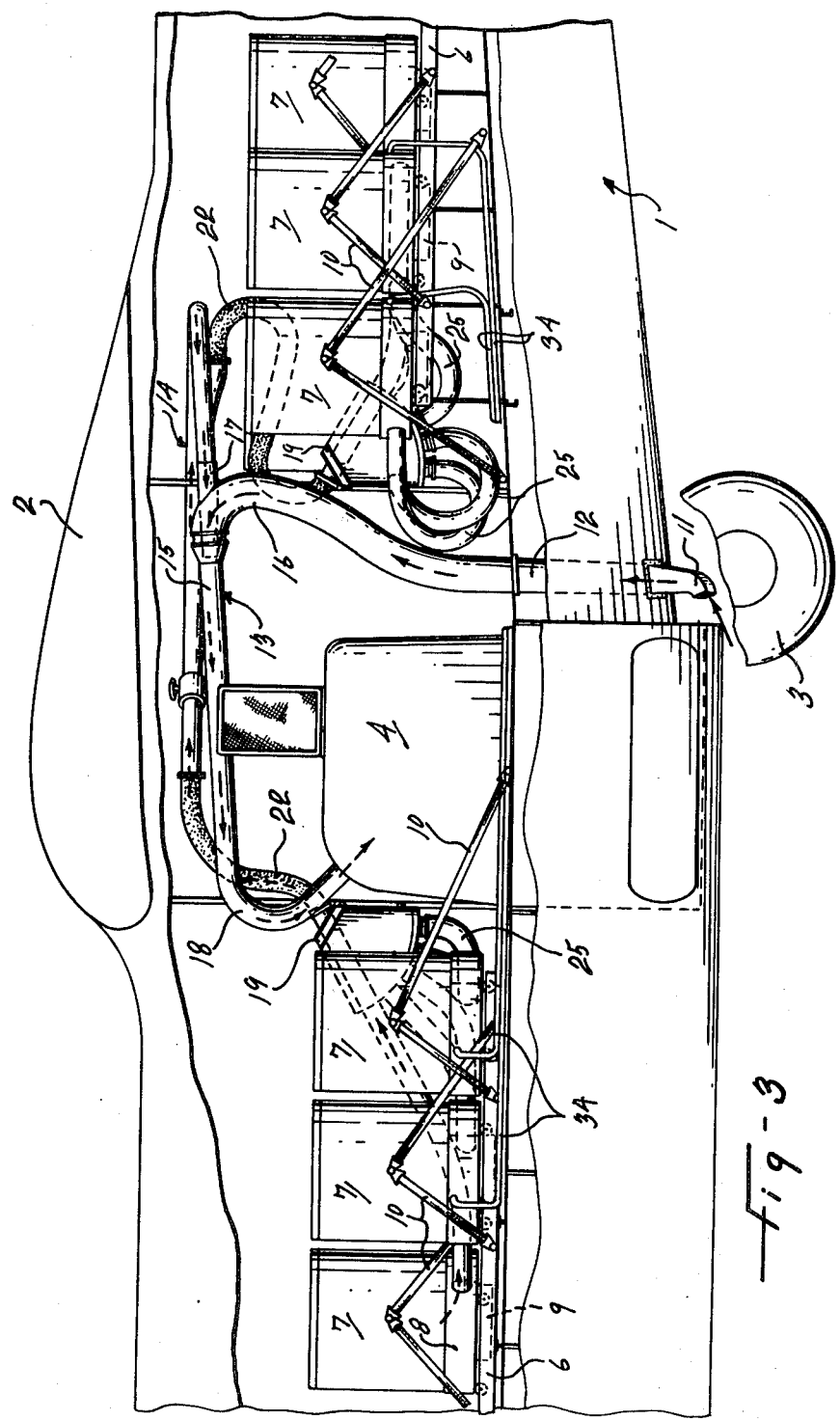

The powder container means effectively includes a plurality of powder containing bins arranged fore and aft of the center of gravity of the aircraft, a compressed air supply pump is connected to each of the bins to fluidize the powder and facilitate the flow thereof out of the bins, a pair of powder distribution valve devices define a plurality of powder inlets connected to the powder containing bins respectively, each powder distribution valve device has a powder outlet connected to one injection and mixing device, a first group of air supply valves are connected to the group of bins respectively, forward of the center of gravity, a second group of air supply valves are connected to the group of bins respectively aft of the center of gravity and the control is connected to the powder distribution valve devices and to the air supply valves to sequentially actuate the same and empty each forward bin concurrently with a corresponding aft bin.

The above and other objects and advantages of the present invention will be better understood with reference to the following detailed description of a preferred embodiment thereof which is illustrated, by way of example, in the accompanying drawings; in which:

FIG. 1 is a schematic diagram of a powder and water mixing and dropping system according to the present invention;

FIG. 2 is a top plan view of the system of FIG. 1 operatively mounted onboard an aircraft;

FIG. 3 is a side elevation view of the system shown in FIG. 2; and

FIG. 4, on the same sheet of drawings as FIG. 2, is a side elevation view of a powder distribution device forming part of the present invention.

As illustrated in FIGS. 2 and 4, the powder and water mixing and dropping system is operatively mounted onboard an aircraft schematically represented by part of the fuselage 1, the wing 2, and the wheel 3. It must be noted that this aircraft is provided with a fuselage which allows amphibious operation as well as normal landing and take off.

More particularly, the powder and water mixing and dropping system includes a pair of liquid tanks 4 and 5 symmetrically mounted with respect to the center of gravity of the aircraft. The tanks are provided each with a bottom door, not shown, which selectively opens to outwardly drop the liquid from the tank. Roller beds, each formed of a pair of parallel roller runs 6, are fixed on the floor of the aircraft fore and aft of the liquid tanks 4 and 5. The two roller runs 6 of each roller bed are laterally spaced apart for a purpose which will be better understood later.

Generally cylindrical powder containers 7 are mounted on the roller beds both fore and aft of the tanks 4 and 5. The group of powder containers 7 forward of the tanks has the same number of containers as the group aft of the tanks such that for each powder container forward of the tanks there is a corresponding powder container aft of the tanks, and vice versa. Each powder container is of the bin type as identified by the trademark PHOS-BIN of Monsanto Company. Each of these bins includes a plastic base 8 having a downward projection 9 laterally guided between the two runs 6 of the supporting roller bed. Essentially, each such bin 7 has its plastic base 8 formed with a compressed air inlet diametrically aligned with a powder and air outlet, not shown, and is arranged such that the inward flow of compressed air fluidizes the powder to facilitate outward flow thereof. The powder containing bins 7 are firmly held in place by tie down straps 10 suitably connected thereto and to the internal structure of the aircraft.

A pair of water scoops 11 project downwardly from the bottom of the fuselage to pick up water upon forward displacement of the aircraft on a body of water such as a lake or a river. Each water scoop is connected to an upwardly extending tube 12.

A pair of powder injection and powder and water mixing devices 13 and 14 extend lengthwise of the aircraft and are firmly held in elevated position by any appropriate bracket or straps, not shown. Each powder injection and powder and water mixing device includes an outlet tube 15 for the powder and water mixture, and water inlet tube 16 connected to the upward tube 12 and of decreasing cross section at its outer end to merge with the outlet mixing tube 15. The injection and mixing device also includes a powder injection or inlet tube 17 of smaller diameter than the water inlet tube 16 and engaging in the latter, as shown by the dotted lines in FIGS. 1, 2, and 3. It may be noted that the internal end of the powder inlet tube 17 is coaxial with the water inlet tube 16 to leave an annular internal space around the latter of smaller cross sectional area than the water inlet tube. The water is therefore accelerated in passing through the annular space thus creating a vacuum to draw the powder from the containers and to inject it into the outlet mixing tube 15 from where it is discharged into the tank 4 or 5 through a tube 18.

A pair of powder distribution valve devices 19 are mounted fore and aft respectively of the liquid tanks 4 and 5. As best seen in FIG. 4, each powder distribution valve device 19 includes a pair of sector shape side walls between which is pivoted a tube 20 about a pivot 21 defining a pivot axis extending transversely through the pivoting tube. The latter constitutes the outlet of the valve device 19 and is connected to a flexible tube 22 which at its other end is connected to the tubular powder inlet 17 of the corresponding injection and mixing device 13 or 14. The other end of the pivoting tube 20 is slidably engaged in mutually facing guideways 23 secured against the inner side of the side walls, respectively. Five tubular powder inlets 24 are fixed in spaced apart relationship along the arc shape edge of the two side walls of the valve device 19. A powder dispensing tube 25 is connected between the powder outlet at the base of each bin 7 and a corresponding inlet 24 of the corresponding powder distribution valve device 19. As can be seen in the drawings, the forward bins 7 are sequentially connected to the powder inlets 24 of the forward valve device 19 while the aft bins 7 are sequentially connected to the powder inlets 24 of the aft valve device 19. An actuator 26 is connected to each pivot or shaft 21 to sequentially pivot the corresponding tube 20 for sequential endwise registry thereof with the powder inlets 24.

As now shown in FIG. 1, a pump or compressor 27 is mounted onboard the aircraft and is connected via a pair of compressed air lines 28 to ten compressed air supply valves 29 of the solenoid type arranged in two groups fore and aft respectively of the water tanks 4 and 5. The air compressor or pump 27 is energized by a conductor 30 connected to control switch 31 preferably installed in the cockpit of the aircraft. An indicator light 32 is preferably connected to the air compressor 27 to indicate the required pressure level for proper operation of the system. Each of the solenoid valves 29 and the 5-way rotary actuators 26 is electrically connected to five (5) contacts 33 of the control switch 31 such that rotary stepwise actuation of the latter will produce sequential operation of the air supply valves 29 and of the distribution valve device 19. A compressed air supply tube or line 34 connects each air supply valve 29 to the compressed air inlet of the corresponding bin.

Before takeoff, the powder containing bins 7 are loaded and secured onboard by the straps 10 and the compressed air tubes 34 and the powder and air outlet tubes 25 are connected to the bases 8 of the bins 7. When the aircraft is lowered and travels on a body of water, the actuation of the control switch 31 causes the pivoting tube 20 of each powder distribution valve device 19 to register with one of the powder inlets 24. An air supply valve 29 forward of the center of gravity and a corresponding air supply valve 29 aft of the center of gravity are also actuated such that compressed air is blown in the base 8 of the corresponding forward bin and aft bin. This happens simultaneously with water scooping by the scoops 11. The water inflow produced by the water scooping produces injection of the powder from the forward bin 7 into the injection and mixing device 13 concurrently with injection of the powder from the aft bin into the injection and mixing device 14. The mixing process extends along the tubes 15 and 18 and the mixtures are captured in the tanks 4 and 5 respectively to be dropped at a selected site from the flying aircraft. For subsequent second, third, fourth, and fifth water scoopings, the other bins are similarly emptied in pairs. After all the bins 7 have been emptied, the aircraft must return to a ground station to replace the bins.

It must be noted that the system of the present invention is designed for use of a fire retardant powder in the bins 7 but it is applicable as well to other powder such as fertilizers.

It must be noted that changes in the details of construction may be made without departing from the principle and scope of the invention as defined in the appended claims. For instance, the predetermined quantities or loads of powder can be supplied otherwise than by bins of predetermined size and/or powder load.

What we claim is:

1. A powder and water mixing and dropping system onboard an aircraft, said system comprising a powder injection and powder and water mixing device having a water inlet, a powder inlet, and a mixture outlet, a water dropping tank connected to the mixture outlet to receive a powder and water mixture from the injection and mixing device, a water scoop projecting under the aircraft and connected to said water inlet to supply water to the injection and mixing device, powder container means, a powder distribution device communicating said powder container means with said powder inlet and adapted to selectively inject powder into said powder and water mixing device, and a control connected to said powder distribution device and constructed and arranged to sequentially actuate the latter and allow injection of powder into said injection and mixing device for mixing with scooped water in the latter.

2. A powder and water mixing and dropping system as defined in claim 1, wherein said powder container means includes a plurality of powder containers, said powder distribution device has an outlet connected to said powder inlet and a plurality of powder inlets connected to said powder containers respectively, valve means connected to said powder containers, and said control is connected to said valve means and is arranged to sequentially actuate the latter and sequentially empty said powder containers in the water dropping tank through said powder distribution device and injection of the powder in the injection and mixing device.

3. A powder and water mixing and dropping system as defined in claim 2, further comprising compressed air supply means defining a compressed air outlet, an air supply selection valve means constituting said valve means and having an inlet connected to said compressed air outlet and a plurality of outlets connected to said powder containers respectively, and said control being connected to said air supply selection valve means and arranged to sequentially actuate the latter for powder fluidization and emptying of said powder containers in the water dropping tank through said powder distribution device.

4. A powder and water mixing and dropping system as defined in claim 3, wherein said powder containers constitute a first group of powder containers mounted in the aircraft forward of the center of gravity thereof, a second group of powder containers are mounted in the aircraft aft of the center of gravity thereof, said valve means includes a first group of air supply valves and a second group of air supply valves, said plurality of outlets of said valve means constitutes a first group of air outlets connecting said first group of air supply valves respectively to said forward powder containers, another group of air outlets connect the second group of air supply valves to said powder containers respectively of the second group, and said control is connected to the air supply valves of the first group and to the air supply valves of the second group for powder fluidization and emptying of each forward container concurrently with a corresponding aft container.

5. A powder and water mixing and dropping system as defined in claim 4, wherein said powder injection and powder and water mixing device, said water dropping tank, said water scoop, and said powder distribution device constitute a first powder injection and powder and water mixing device, a first water dropping tank, a first water scoop, and a first powder distribution device respectively, and the mixing and dropping system further includes a second powder injection and powder and water mixing device, a second water dropping tank, a second water scoop, and a second powder distribution device; the second powder injection and powder and water mixing device has a water inlet, a powder inlet, and a mixture outlet, the second water dropping tank is connected to the mixture outlet of the second injection and mixing device, the second water scoop projects under the aircraft and is connected to the water inlet of the second injection and mixing device to supply water thereto, the second powder distribution device has an outlet connected to the powder inlet of the second injection and mixing device and has a plurality of powder inlets connected to the powder containers respectively of the second group; the selective air supply valve means includes a first group and a second group of air supply valves, said air supply valves has each an inlet connected to the compressed air outlet and an outlet connected to said powder containers respectively, and said control is connected to said air supply valves and arranged for powder fluidization and emptying of each forward container concurrently with a corresponding aft container.

6. A powder and water mixing and dropping system as defined in claim 4, wherein said powder distribution device includes a plurality of tubular powder inlets connected to the plurality of powder containers respectively, a tube pivotally connected for sequential endwise registry with any one of said tubular powder inlets and communicating with said powder inlet of the injection and mixing device.

* * * * *